Inventors,
James W. Simpson, Jr.,
Reginald S. Arnold,
by
Their Attorney.

United States Patent Office 3,092,071
Patented June 4, 1963

3,092,071
INDICATOR
James W. Simpson, Jr., and Reginald S. Arnold, Pittsfield, Mass., assignors to General Electric Company, a corporation of New York
Filed June 15, 1960, Ser. No. 36,298
2 Claims. (Cl. 116—129)

This invention relates to indicator mechanisms, and more in particular to means for improving the accuracy thereof.

It is desirable for indicator mechanisms to accurately denote the condition of the phenomena they signify. Yet the accuracy of indicator mechanisms is often reduced when information must be transmitted over a distance from the phenomena being observed to the indicator itself. For example, many types of apparatus have a moving part that is capable of occupying a plurality of positions during operation of the apparatus. It is often necessary to be able to accurately determine the position of such a part from the exterior of the apparatus. Various types of indicators, called position indicators, have been devised for showing the position of these movable parts. However, problems have arisen when the indicator pointer and dial must be located remotely from the moving part because the movement of the part (i.e., information) must be transmitted over a distance through mechanical couplings, such as gears and flexible shafts, to the indicator pointer. In this situation mechanical hysteresis, as for example caused by gear backlash, shaft torsion, or the twisting of a spring in a flexible coupling, can cause inaccuracies to become compounded. Consequently, the indicator pointer may not accurately signify the position of the movable part. Inaccuracies caused by hysteresis also occur in fluid and electrical information transmitting systems.

The loss of motion due to hysteresis causes large inaccuracies in indicator mechanisms in which the indicator pointer is driven by multi-toother gears. In this type of indicator mechanism the movement of the pointer is the same as that of any gear to which it is directly connected, and, in the absence of backlash, the motion of the pointer-connected gear is proportional to that of other gears that drive it. Consequently, if motion of the part being signified is lost in the information transmitting system because of the hysteresis effects mentioned above, the pointer driving gear will not move as much as it should and the pointer will not accurately denote the condition under observation. For example, if the moving part that the indicator signifies were to advance through five equally spaced positions, but 10% of its movement did not reach the pointer driving gear because of mechanical hysteresis in the information transmitting system, then the indicator pointer would come to rest between the fourth and fifth positions. Consequently, anyone observing the indicator could not determine which position the moving part is occupying in this situation.

In the above example the indicator pointer signified an incorrect position because its movement was proportional to that of a gear driving it, and hence it only transmitted the motion received from the information transmitting system. One way these inaccuracies caused by lost motion in the information transmitting system could be reduced would be by greatly stepping down the ratio of the gears. This solution is undesirable, however, because it would increase both the size and the cost of the indicator. We have discovered, however, that when an indicator mechanism is used to signify the position of a part that moves in steps, the undesirable effects of lost motion caused by hysteresis can be eliminated by employing an intermittently moving member, such as a Geneva wheel, in place of the gear that is connected to the indicator pointer. This will result in a very accurate indication of step movement when the intermittently moving member is arranged to index one position even if its driver does not turn a full revolution. Thus the motion of a pointer connected to the intermittently moving member is unproportional to the motion of the driver.

Briefly stated, in accordance with one aspect of our invention, the accuracy of indicator mechanisms can be improved by connecting the indicator pointer to an intermittently moving member, and driving such a member by means coupled to the phenomena signified by the indicator. In the preferred embodiment of our invention the intermittently moving member is a Geneva wheel. However, it will be apparent from the following detailed description that other intermittently moving mechanisms, such as a pin gear actuated by a single-toothed driver, could also be employed, although some reduction in economy or accuracy could result from the use of such other mechanisms.

Therefore, it is an object of our invention to provide an improved indicator mechanism.

Another object of our invention is to provide an indicator mechanism that eliminates inaccuracies caused by hysteresis in a system transmitting information from the phenomena signified to the indicator pointer.

Further object of our invention is to provide an improved mechanical movement.

A still further object of our invention is to provide a method of eliminating inaccuracies caused by hysteresis in a motion transmitting system.

Other objects and advantages of the invention will be apparent from an examination of the following specification taken in connection with the accompanying drawings and claims, and the scope of the invention will be pointed out in the appended claims.

Figure 1:
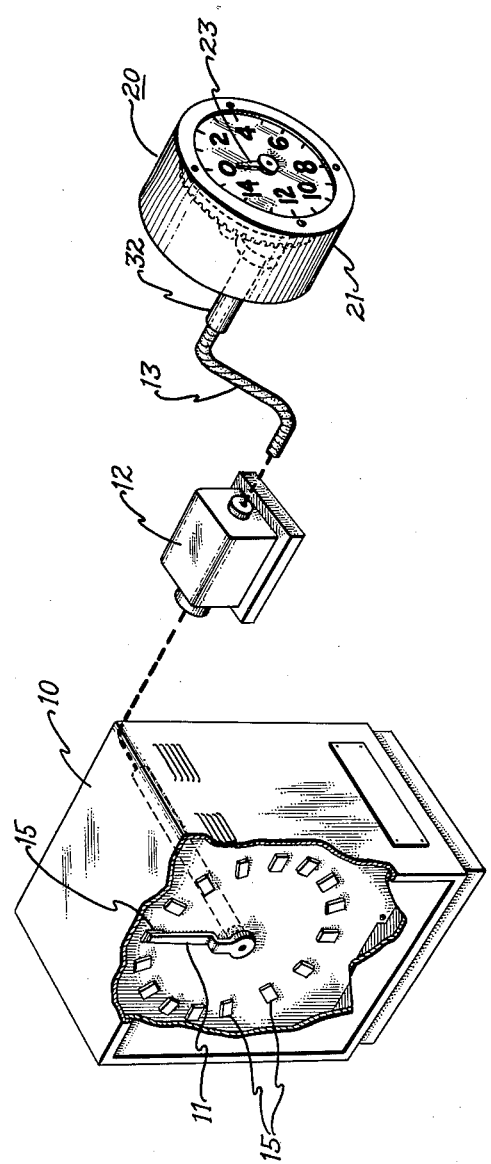
FIGURE 1 is a schematic representation of an embodiment of our invention.

Referring now to the drawing, and more in particular to FIGURE 1, therein is shown an embodiment of apparatus constructed according to the principles of our invention. A device 10 has a movable part 11 which can occupy a plurality of positions during operation of the device. The part 11 may be connected in any manner to some movement transmitting means 12, which in turn may be connected through a flexible coupling 13 to an indicator 20. This schematic illustration of the device 10 having a moving part 11 is typical of many types of apparatus which have parts that move to different operating positions in steps. For example, the part 11 could be a contact for closing one of a number of switches 15, or could be a contact which selects the tap on the winding of various known types of voltage regulating equipment. The means 12 is intended to be a schematic representation of any mechanism, such as a gear train, which will transmit motion from the moving part 11 to a remotely located indicator 20.

Figure 2:
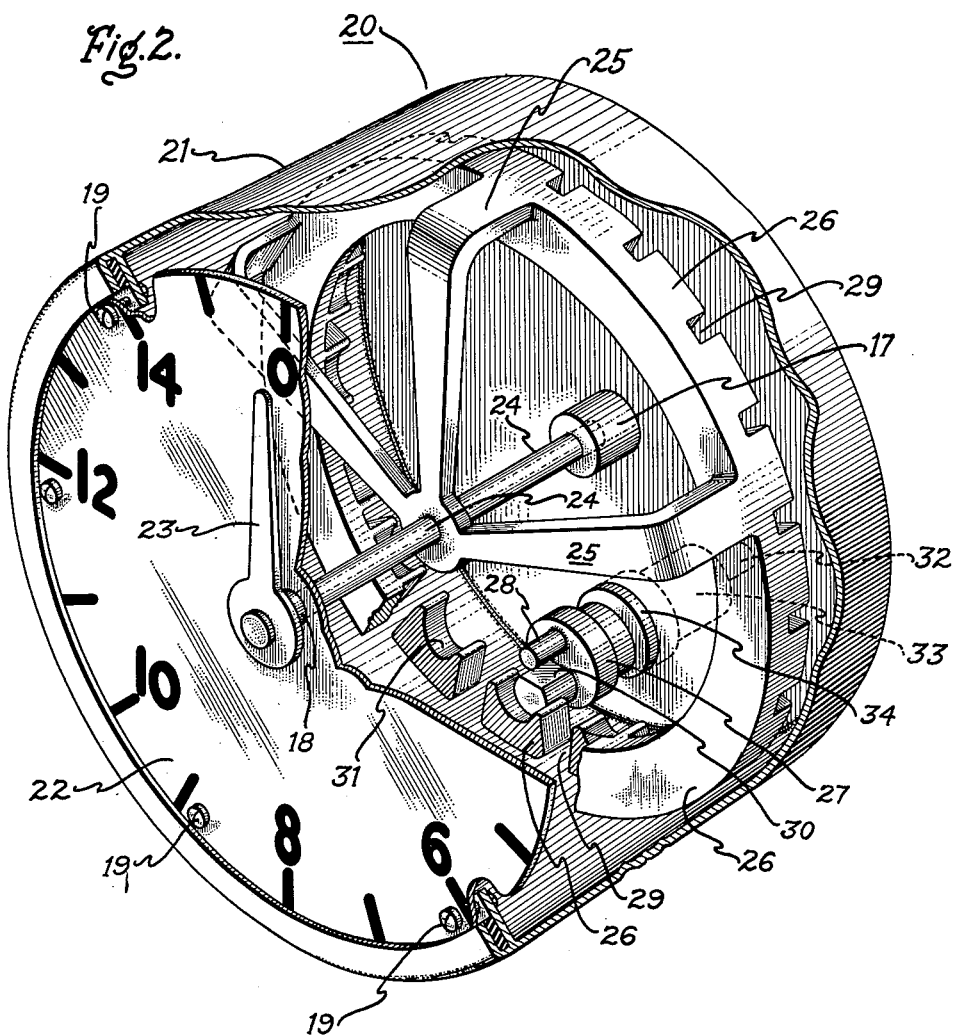
FIG. 2 is an enlarged view of the indicator 20 of FIG. 1 with its outer casing and Geneva wheel partly broken away so as to show the details of its internal mechanism.
Figure 3:
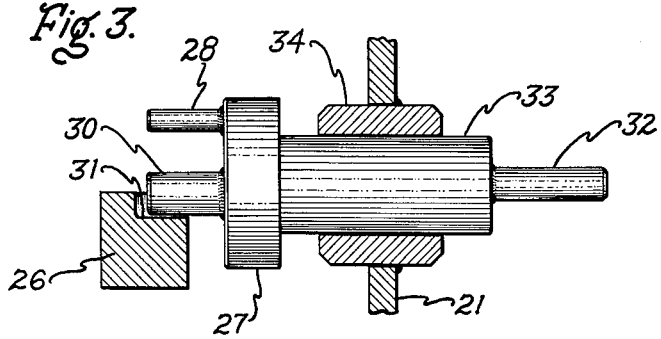
FIG. 3 is an enlarged side view of the Geneva wheel driver viewed perpendicular to its axis.

In FIGURE 2 an embodiment of an indicator in accordance with the preferred embodiment of our invention is shown to employ a Geneva wheel as its intermittently moving member. The indicator may comprise a housing 21 having a dial face 22 secured thereto by suitable means such as screws 19. An indicating means, such as a pointer 23, is mounted for rotational movement around the dial face 22 to signify some phenomena, such as the step movement of the part 11. The pointer 23 is attached to and moves with a shaft 24, which in turn is attached to spokes 25 of a Geneva wheel 26. The shaft 24 may be rotatably supported by bearings 17 and 18. The Geneva wheel 26 may be intermittently driven by suitable means such as a member 27 having a driving element or pin 28 for engaging indentations such as peripheral slots 29 which open toward the center of the wheel. The number 27 may also have a locking element 30 that mates with arcuate recesses 31 located between the slots in the Geneva wheel 26. The member 27 may be attached to a rotatable shaft 32 which can be coupled to a flexible shaft or other motion transmitting means. In FIGURE 3 the shaft 32 is illustrated as having an enlarged portion 33 which passes through an opening in the housing 21 and is rotatably supported by a bearing 34.

Figure 4:
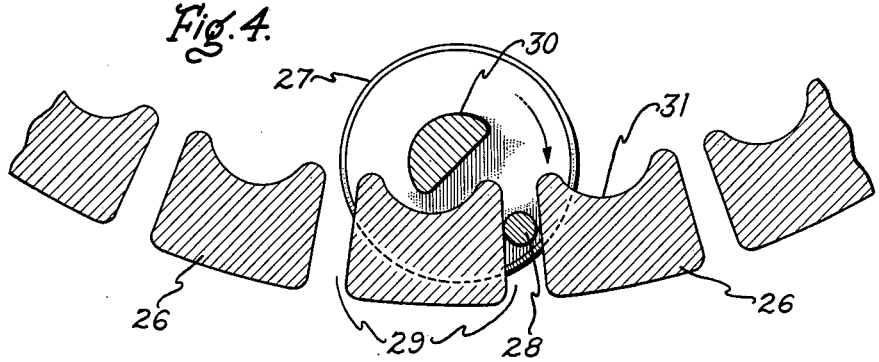
FIG. 4 is an enlarged end view of the Geneva wheel driver viewed parallel to its axis and showing it in driving relation to the adjacent part of the Geneva wheel.

In FIGURE 4 the driving pin 28 is shown driving the Geneva wheel 26 by contacting a portion of the wheel that defines a slot 29. It will be apparent that for every rotation of the member 27 the pin 28 will engage one slot 29 and index the Geneva wheel 26 through an arc corresponding to the distance between adjacent slots 29. The extent of the movement of the wheel 26 can be varied by varying the number of slots 29 and by modifying the action of the pin 28 accordingly. Consequently, the number of positions the indicator 20 can signify can also be varied as required.

Figure 5:
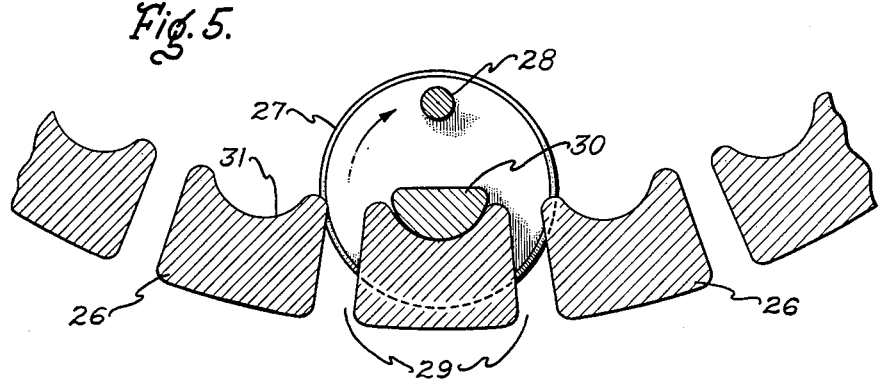
FIG. 5 is a view similar to FIG. 4 showing the Geneva wheel driver in locking relation to the adjacent part of the Geneva wheel.

When the driving member 27 rotates rapidly the pin 28 may strike the portion of the wheel 26 defining a slot 29 a relatively sharp blow and thus impart momentum to the wheel. In order to stop the intermittent movement of the wheel 26 after it has passed through the desired arc, a locking element 30 may be applied to the driving member 27. In FIGURE 5 the locking element 30 is shown to mate with an arcuate recess 31 located between slots 29. Thus the element 30 will prevent movement of the Geneva wheel 26 and will lock the wheel in position until the element 27 is caused to rotate again by the phenomena signified on the indicator 20. It will be apparent from an inspection of the indicator driving mechanism described above that the driving pin 28 can cause the Geneva wheel 26 and pointer 23 to move in either a clockwise or counter-clockwise direction depending on which direction the shaft 32 is caused to rotate by the phenomena signified.

Referring again to FIGURE 1, when the moving part 11 has been caused to move, for example, from the contact 15 it is shown engaging to the one immediately next to it in the clockwise direction, motion could be imparted to a gear train in the movement transmitting means 12. Such a gear train could be designed to magnify the motion to one complete revolution which could then be transmitted to the flexible coupling 13. However, backlash between the gears caused by the clearance between their teeth, or torsion in shafts holding the gears, or torsion of a spring or other flexible connection in the flexible coupling 13, may cause a loss of motion such that the end of the flexible coupling 13 which is connected to the rod 32 may not make a complete revolution. In the prior art indicator mechanisms which employ multi-toothed gears to drive a pointer, this mechanical hysteresis, or loss of motion, would result in the pointer moving through less of an arc than the part 11, and an inaccurate reading would result. However, when an intermittently moving Geneva wheel is employed in accordance with our invention, the pin 28 need not make a complete revolution to cause the Geneva wheel 26 to index through the current arc. This will be apparent from an inspection of FIGURES 4 and 5. Assuming that the indicator parts occupy the position shown in FIGURE 5, if the pin 28 is caused to move an arc of, for example, only 270°, it will move into contact with a slot 29, as shown in FIGURE 4, and then continue to rotate until the Geneva wheel 26 has been indexed to the next position. This will result in the pointer 23 moving through the required arc, and the fact that motion was lost due to hysteresis in the motion transmitting system will not cause inaccuracies in the reading on the indicator dial. When the part 11 moves to the next corresponding clockwise position, the motion transmitting system comprising the elements 12 and 13 will impart substantially a complete revolution to the element 32 because the system will be substantially saturated with hysteresis, since the clearances between gear teeth, shaft twisting, and spring twisting, will already have occurred. On the other hand, if the element 11 were to move in a counter-clockwise direction back to its original position, the loss of motion in the information transmitting system, caused by the above indicated conditions, would cause the element 28 to rotate less than a complete revolution in the counter-clockwise direction. However, because the element 32 need make only a partial revolution to cause the Geneva wheel 26 to index a full position, the loss in motion would not result in an inaccurate reading on the dial 22. To insure that the effects of lost motion or hysteresis are eliminated regardless of the direction of rotation of the member 27, the element 28 should be equidistant from the slots 29, as shown in FIG. 5, when the pointer 23 is calibrated to the markings on the dial 22. Thus the element 28 will first engage a slot 29 after less than one half a revolution of the member 27 in either the clockwise or counter-clockwise direction. It will be apparent to those skilled in the art that the above described operation of the Geneva wheel would result in an accurate reading even though the part 15 moved through several positions at one time.

By employing only a single driving element 28 to drive the wheel 26, rather than a plurality of such elements, the maximum reduction in the effect of hysteresis or lost motion may be obtained. For example, if the ratio of gears in the means 12 that turns the shaft 32 were stepped down, then two driving elements 28 could be employed in such a manner that each could index a Geneva wheel one step after one-half a revolution of the driving member 27. However, if, for example, 15% of the rotation of the driving member 27 were lost because of hysteresis in the system, then twice this amount, or 30%, of the motion of each driving element 28 would be lost, and an inaccurate reading could result. But in our preferred embodiment, only 15% of the motion of the driving element 28 would be lost in the above example, and consequently its relative effect on the accuracy of the reading is minimized.

Although the form of the invention herein shown and described constitutes the preferred embodiment thereof, it is not intended herein to illustrate all of the equivalent forms or ramifications thereof. For example, it will be apparent to those skilled in the art the slots 29 and recesses 31 could be located on the outer, rather than inner, periphery of the Geneva wheel 26, and the member 27 could be relocated so that the driving pin 28 and locking element 30 engage their respective mating parts on the exterior periphery of the wheel. However, by locating these elements in the interior periphery of the wheel 26, as illustrated, the indicator 20 can be made in a smaller size, since its housing 21 need not be enlarged to house an externally located driving member 27. It will be also understood that the words employed are words of description rather than of limitation, and that various changes may be made without departing from the spirit or scope of the invention herein disclosed. It is

What we claim as new and desire to secure by Letters Patent of the United States is:

1. An indicator comprising a casing, a dial adjacent one end of said casing, a rotatable shaft extending through an opening in said dial, a pointer attached to one end of said shaft and movable therewith, a Geneva wheel in said casing attached to the other end of said shaft and movable therewith, said Geneva wheel having a plurality of circumferentially spaced slots therein, said slots opening toward said shaft, said Geneva wheel defining arcuate recesses between adjacent slots, a driver for said Geneva wheel comprising a rotatable shaft having one end extending through the other end of said casing, a pin attached to said shaft end for indexing said Geneva wheel by engaging said slots, a locking element attached to said shaft end for limiting movement of said Geneva wheel by engaging said recesses, and the other end of said shaft being adapted for receiving movement from phenomena signified by said indicator.

2. In combination, apparatus having a part capable of occupying different positions, an indicator for signifying the position occupied by said part, said indicator comprising a casing, a dial adjacent one end of said casing, a rotatable shaft extending through an opening in said dial, a pointer attached to one end of said shaft and movable therewith, a Geneva wheel in said casing attached to the other end of said shaft and movable therewith, said Geneva wheel having a plurality of circumferentially spaced slots therein, said slots opening toward said shaft, said Geneva wheel defining arcuate recesses between adjacent slots, a driver for said Geneva wheel comprising a rotatable shaft having one end extending through the other end of said casing, a pin attached to said shaft end for indexing said Geneva wheel by engaging said slots, a locking element attached to said shaft end for limiting movement of said Geneva wheel by engaging said recesses, and a motion transmitting system connecting said driver to said part.

References Cited in the file of this patent

UNITED STATES PATENTS

| | | |
|---|---|---|
| 119,576 | Cooper | Oct. 3, 1871 |
| 719,198 | Cyr | Jan. 27, 1903 |
| 1,618,140 | Seward | Feb. 15, 1927 |
| 2,261,723 | Hoffman | Nov. 4, 1941 |
| 2,704,395 | Heidegger | Mar. 22, 1955 |
| 2,795,150 | Seidler | June 11, 1957 |

FOREIGN PATENTS

| | | |
|---|---|---|
| 702,817 | Great Britain | Jan. 20, 1954 |

OTHER REFERENCES

Publication: "Ingenious Mechanisms for Designers and Inventors," vol. II, The Industrial Press, New York (1936), pages 176—177.